(12) United States Patent
Nishizono

(10) Patent No.: US 9,578,699 B2
(45) Date of Patent: Feb. 21, 2017

(54) CONTROL CIRCUIT

(71) Applicant: Spansion LLC, Sunnyvale, CA (US)

(72) Inventor: Kazunori Nishizono, Aichi (JP)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 14/619,592

(22) Filed: Feb. 11, 2015

(65) Prior Publication Data

US 2016/0234893 A1 Aug. 11, 2016

(51) Int. Cl.
*H05B 33/08* (2006.01)

(52) U.S. Cl.
CPC ..... *H05B 33/0815* (2013.01); *H05B 33/0845* (2013.01); *H05B 33/0887* (2013.01)

(58) Field of Classification Search
CPC ............ H05B 33/0815; H05B 33/0818; H05B 33/0884; H05B 33/0809; H05B 33/0845
USPC ..................... 315/224, 294, 200 R
See application file for complete search history.

(56) References Cited

U.S. PATENT DOCUMENTS

| | | | |
|---|---|---|---|
| 5,600,789 A | 2/1997 | Parker et al. | |
| 8,508,330 B1 | 8/2013 | Godbole et al. | |
| 2006/0039093 A1 | 2/2006 | Gauthier et al. | |
| 2012/0242238 A1* | 9/2012 | Chen | H05B 33/0815 315/200 R |
| 2013/0134895 A1* | 5/2013 | Kanamori | H05B 37/02 315/224 |
| 2014/0265916 A1* | 9/2014 | Melanson | H05B 33/0809 315/291 |
| 2014/0285100 A1* | 9/2014 | Akahoshi | H02M 7/217 315/200 R |
| 2015/0048757 A1* | 2/2015 | Boonen | H05B 33/0845 315/294 |
| 2015/0077009 A1* | 3/2015 | Kunimatsu | H05B 33/0815 315/224 |
| 2015/0146461 A1* | 5/2015 | Deng | H02M 7/1557 363/85 |

OTHER PUBLICATIONS

International Search Report for International Application No. PCT/US16/13833 dated Mar. 31, 2016; 2 pages.
Written Opinion of the International Searching Authority for International Application No. PCT/US16/13833 dated Mar. 31, 2016; 5 pages.

* cited by examiner

*Primary Examiner* — Douglas W Owens
*Assistant Examiner* — Syed M Kaiser

(57) ABSTRACT

Provided is a control circuit capable of suppressing flickering of an LED while preventing degradation of the power efficiency. A control circuit is configured to control electric power to an LED illumination based on a rectified drive voltage, the rectified drive voltage being a drive signal rectified by a rectifier, the drive signal being an AC signal whose phase is controlled by a dimmer including a switching device. The control circuit includes a time period detection part configured to detect a time period in which a voltage value of the rectified drive voltage is less than or equal to a predetermined value; and a dimmer current control part configured so that a control current to the dimmer is greater than or equal to a holding current of the switching device during the time period detected.

11 Claims, 11 Drawing Sheets

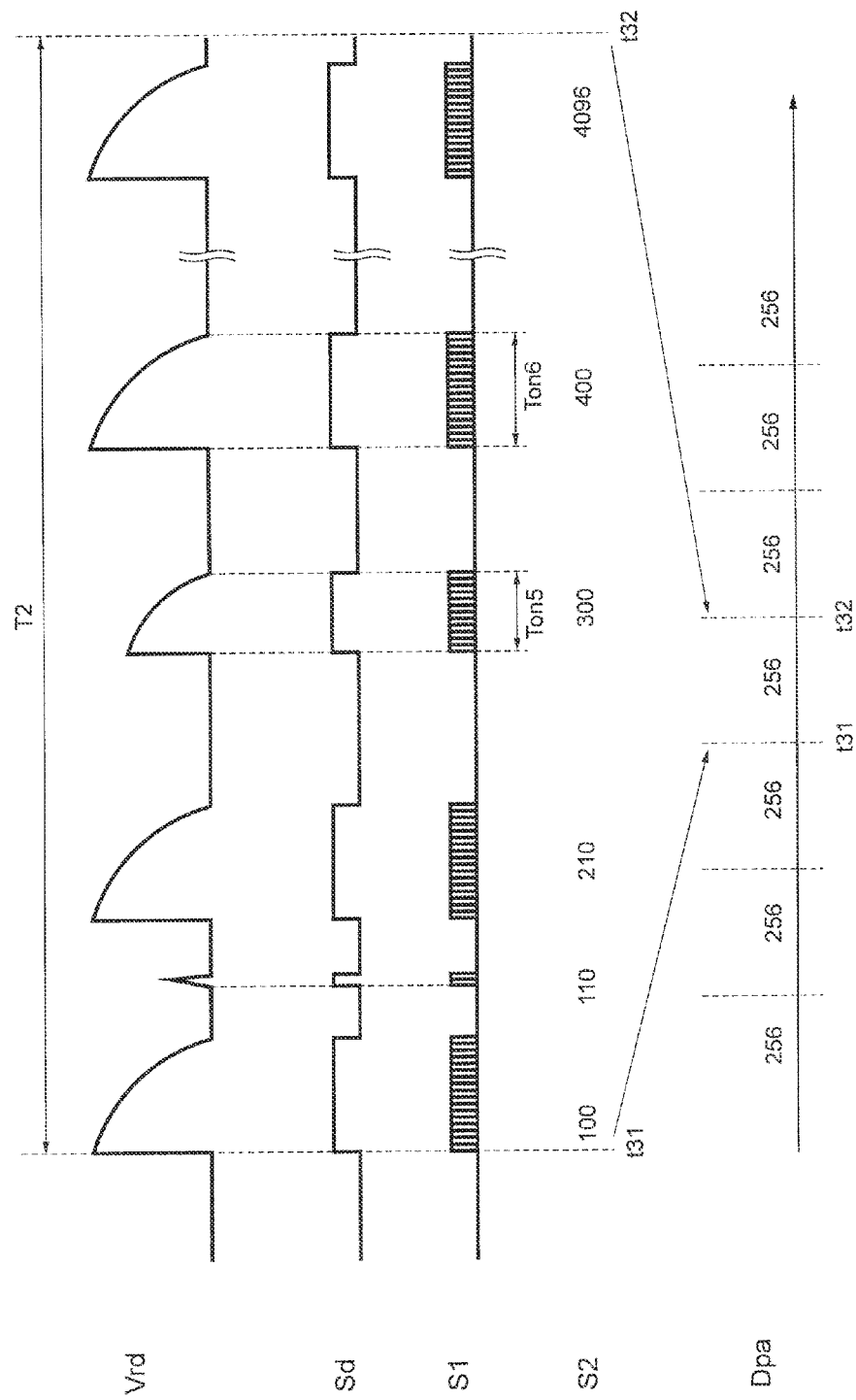

CONTROL CIRCUIT

BACKGROUND

As a control circuit configured to control electric power supplied to a load such as an LED, there has conventionally been known, for example, an impedance matching circuit disclosed in U.S. Pat. No. 7,656,103B2, which, using a control signal from a control block, is capable of maintaining a conducting state of a triac in a dimmer by supplying an additional current to the triac when a load current supplied to a load is insufficient.

Incidentally, the current value of feedback current fed back to the control circuit after flowing through the load is unstable. Therefore, when a dimmer current supplied to the dimmer is controlled based on the feedback current, if the current value of the feedback current drops, even for a moment, below a holding current required for holding the triac of the dimmer in a conducting state, the triac turns off so that the on-time of a signal supplying electric power to the load varies per period. As a result, the LED looks like it is flickering.

On the other hand, in order to keep the triac in a conducting state, it may be considered to continuously supply, other than the feedback current, a current greater than or equal to the holding current to the dimmer. However, such a method degrades the power efficiency and thus is not adequate.

SUMMARY

Some aspects of the present invention have an object to provide a control circuit capable of suppressing flickering of an LED while preventing degradation of the power efficiency.

According to an aspect of the present invention, a control circuit is configured to control electric power to a load based on a rectified drive signal, the rectified drive signal being a drive signal rectified by a rectifier, the drive signal being an alternating-current signal whose phase is controlled by a dimmer comprising a switching device, and includes a time period detection part configured to detect a time period in which an amplitude of the rectified drive signal is less than or equal to a predetermined level; and a dimmer current control part being configured so that a control current to the dimmer is greater than or equal to a holding current of the switching device during the time period.

According to another aspect of the present invention, a control circuit is configured to control electric power to a load based on a rectified drive signal, the rectified drive signal being a drive signal rectified by a rectifier, the drive signal being an alternating-current signal whose phase is controlled by a dimmer comprising a switching device, and includes a time period detection part configured to output a detection signal including a pulse whose pulse width is based on a time period in which an amplitude of the rectified drive signal is greater than a predetermined level; and a load current control part configured to control a load current to the load based on a pulse density of the detection signal in a predetermined term.

In the embodiments presented herein, the terms "part", "device" and "system" not only mean physical mechanisms, but also include realization of functions that the "part", "device" and "system" have, by software. The function that one "part", "device" or "system" has may be realized by two or more physical mechanisms or devices. Alternatively, the two or more functions of "part", "device" and "system" may be realized by one physical mechanism or device.

BRIEF DESCRIPTION OF THE DRAWINGS

The accompanying drawings are incorporated herein and form a part of the specification.

FIG. 11 is a signal waveform diagram for explaining the operation of the signal processing circuit shown in FIG. 7.

In the drawings, like reference numbers generally indicate identical or similar elements.

DETAILED DESCRIPTION

Figure 1:
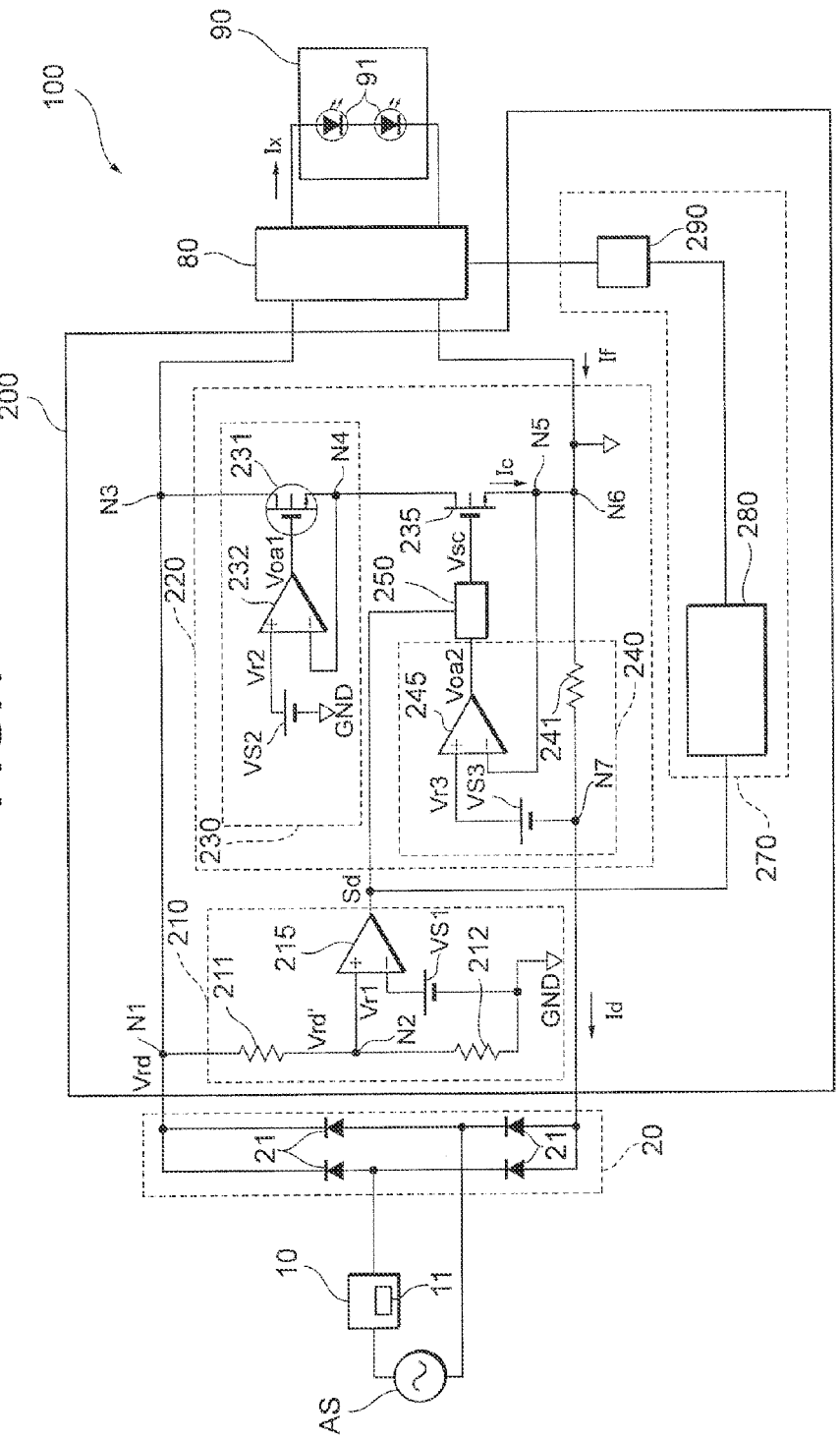
FIG. 1 is a block diagram showing an example of an illumination system according to an embodiment of the present invention.

FIGS. 1 to 11 are diagrams for explaining an illumination system according to an embodiment of the present invention. FIG. 1 is a block diagram showing an example of an illumination system 100 according to the embodiment. The illumination system 100 is an illumination system capable of adjusting the brightness of an LED lighting equipment (hereinafter referred to as an "LED illumination"), for example. As shown in FIG. 1, the illumination system 100 includes, for example, a dimmer 10, a rectifier 20, a control circuit 200, a constant current circuit 80, and an LED illumination 90.

An alternating-current (AC) voltage is supplied to the dimmer 10 from, for example, an external AC source AS. The effective value of an AC voltage is a value falling within a range, for example, from about 100V to about 240V. The dimmer 10 includes a switching device 11 such as a triac. The dimmer 10 is configured to control the phase of a signal (waveform) of supplied AC voltage to output a drive voltage. In other words, the dimmer 10 is a phase control type dimmer and controls the on-phase angle (on-time) of the switching device 11 per half period of the AC voltage signal, thereby outputting a drive voltage which is the AC voltage whose duty cycle has been changed.

For example, the dimmer 10 may include a controller configured to control on and off the switching device 11. In this case, the controller supplies a trigger current to a gate electrode of the switching device 11 in accordance with dimming information, such as a value in a range, for example, from about 0% to about 100%, thereby controlling the on-phase angle of the switching device 11 supplied with an AC voltage. Consequently, the supplied AC voltage is partially cut so that a drive voltage being the AC voltage whose duty cycle has been changed is output.

The switching device 11 once turned on remains in a conducting state (on-state) regardless of a trigger current supplied to the gate electrode as long as a current of a predetermined value or more flows between its terminals. This current of the predetermined value is called a holding current Ih. With a current greater than or equal to the holding current Ih flowing in the switching device 11, the conducting state of the switching device 11 can be maintained.

A drive voltage output from the dimmer 10 is input to the rectifier 20. The rectifier 20 is configured to rectify the drive voltage and output a rectified drive voltage. As shown in FIG. 1, the rectifier 20 includes, for example, four diodes 21. In this case, the four diodes 21 are bridged to carry out full-wave rectification of the drive voltage. Consequently, the AC drive voltage is converted into a direct-current (DC) drive voltage.

The drive voltage rectified by the rectifier 20 (hereinafter referred to as a "rectified drive voltage Vrd") is input to the control circuit 200. The control circuit 200 is configured to control electric power supplied to the LED illumination 90 based on the rectified drive voltage Vrd. The configuration of the control circuit 200 will be described later.

The constant current circuit 80 is configured to supply a predetermined current (hereinafter referred to as a "load current Ix") to the LED illumination 90. The load current Ix supplied to the LED illumination 90 is fed back as a feedback current If to the control circuit 200 and the dimmer 10 via the constant current circuit 80.

In FIG. 1, there is shown an example in which the LED illumination 90 includes two LEDs 91, but the configuration is not limited thereto. The LED illumination 90 may include one, or three, or more LEDs 91.

Next, the configuration of the control circuit 200 will be described.

The control circuit 200 includes, for example, a time period detection part 210 and a dimmer current control part 220.

The time period detection part 210 is configured to detect a time period in which the magnitude, e.g., the voltage value, of the rectified drive voltage Vrd is less than or equal to a predetermined value. As this predetermined value, a threshold value Vth1 is set to a value falling within a range, for example, from about 5V to about 10V. The time period detection part 210 includes, for example, a resistor 211, a resistor 212, and a comparator 215.

The resistors 211 and 212 are disposed between a node N1 and a ground GND. The resistors 211 and 212 divide a voltage of the node N1, i.e. the rectified drive voltage Vrd, by a division ratio corresponding to their resistance values to generate a divided rectified drive voltage Vrd'.

The comparator 215 has a non-inverting input terminal connected to a node N2 so that the rectified drive voltage Vrd' divided by the resistors 211 and 212 is input to this non-inverting input terminal. On the other hand, the comparator 215 has an inverting input terminal connected to a voltage source VS1 so that a reference voltage Vr1 is supplied to this inverting input terminal from the voltage source VS1.

The comparator 215 makes a comparison between the divided rectified drive voltage Vrd' and the reference voltage Vr1 and outputs a detection signal Sd based on a result of the comparison. The comparator 215 outputs a detection signal Sd of a relatively high voltage level (hereinafter referred to as "H level") when, for example, the divided rectified drive voltage Vrd' is greater than the reference voltage Vr1. On the other hand, the comparator 215 outputs a detection signal Sd of a relatively low voltage level (hereinafter referred to as "L level") when, for example, the divided rectified drive voltage Vrd' is less than or equal to the reference voltage Vr1.

For example, when the rectified drive voltage Vrd changes from a value greater than the threshold value Vth1 to a value less than or equal to the threshold value Vth1, the detection signal Sd of the comparator 215 changes from H level to L level. Then, while the voltage value of the rectified drive voltage Vrd is less than or equal to the threshold value Vth1, the detection signal Sd of the comparator 215 remains at L level. Accordingly, the time period detection part 210 can detect a time period in which the voltage value of the rectified drive voltage Vrd is less than or equal to the threshold value Vth1.

On the other hand, for example, when the rectified drive voltage Vrd changes from a value less than or equal to the threshold value Vth1 to a value greater than the threshold value Vth1, the detection signal Sd of the comparator 215 changes from L level to H level. Then, while the voltage value of the rectified drive voltage Vrd is greater than the threshold value Vth1, the detection signal Sd of the comparator 215 remains at H level. Accordingly, the time period detection part 210 can also detect a time period in which the voltage value of the rectified drive voltage Vrd is greater than the threshold value Vth1. Since the comparator 215 continues to output an H-level detection signal Sd while the voltage value of the rectified drive voltage Vrd is greater than the threshold value Vth1, rising and falling edges of an H-level pulse in the detection signal Sd coincide with a time period in which the voltage value of the rectified drive voltage Vrd is greater than the threshold value Vth1. Therefore, the detection signal Sd includes an H-level pulse whose pulse width is equal to a time period in which the voltage value of the rectified drive voltage Vrd is greater than the threshold value Vth1.

In FIG. 1, there is shown an example in which the comparator 215 outputs an H-level detection signal Sd when the voltage value of the rectified. drive voltage Vrd is greater than the threshold value Vth1, while the comparator 215 outputs a L-level detection signal Sd when the voltage value of the rectified drive voltage Vrd is less than or equal to the threshold value Vth1. However, the configuration is not limited thereto. For example, the comparator 215 may be configured, by inverting its output, to output a L-level detection signal Sd when the voltage value of the rectified drive voltage Vrd is greater than the threshold value Vth1, and to output an H-level detection signal Sd when the voltage value of the rectified drive voltage Vrd is less than or equal to the threshold value Vth1. Alternatively, the time period detection part 210 may include, instead of the comparator 215, an A/D converter circuit, a plurality of comparators with different threshold values, and so on. In this case, the time period detection part 210 can output a detection signal Sd including a plurality of bits and, accordingly, when the waveform (signal) of the rectified drive voltage Vrd is gentle around the threshold value Vth1, it is possible to obtain a stable detection signal Sd.

The dimmer current control part 220 is configured to control a current flowing to the dimmer 10 (hereinafter referred to as a "dimmer current Id"). The dimmer current control part 220 includes, for example, a constant voltage circuit 230, a control current switch 235, a control current circuit 240, and a clamp circuit 250.

In addition, the control circuit 200 further includes a load current control part 270.

The load current control part 270 is configured to control the load current Ix to the LED illumination 90. The load current control part 270 controls the load current Ix based on a pulse density of the detection signal Sd in a predetermined term. The load current control part 270 includes, for example, a signal processing circuit 280 and a D/A converter circuit 290.

In FIG. 1, there is shown an example in which the control circuit 200 includes both the dimmer current control part 220 and the load current control part 270, but the configuration is not limited thereto. For example, the control circuit 200 may include only one of the dimmer current control part 220 and the load current control part 270.

The constant voltage circuit 230 is configured to control a voltage of a node N4 to a predetermined value or less. The constant voltage circuit 230 includes, for example, a switch 231 and an operational amplifier 232.

The switch 231 is a switching device, for example, an n-channel metal oxide semiconductor field-effect transistor (hereinafter referred to as a "MOSFET"). The switch 231 has a drain connected to a node N3 and a source connected to the node N4.

The operational amplifier 232 has a non-inverting input terminal connected to a voltage source VS2 so that a reference voltage Vr2 is supplied to this non-inverting input terminal from the voltage source VS2. The reference voltage Vr2 of the voltage source VS2 is a relatively low voltage, for example, about 0.5V. On the other hand, the operational amplifier 232 has an inverting input terminal connected to the node N4. Further, the operational amplifier 232 has an output terminal connected to a gate of the switch 231.

The operational amplifier 232 amplifies a difference between the reference voltage Vr2 and the voltage of the node N4 and outputs a voltage Voa1 to the gate of the switch 231. On the other hand, the source of the switch 231 is connected to the inverting input terminal of the operational amplifier 232 via the node N4. Consequently, since the output of the operational amplifier 232 is negatively fed back to the inverting input terminal of the operational amplifier 232 via the switch 231, the voltage of the inverting input terminal of the operational amplifier 232 is controlled to be equal to that of the non-inverting input terminal of the operational amplifier 232 by the operation of the operational amplifier 232.

The control current switch 235 is a field-effect transistor configured so that a control current Ic flows as a drain current. Specifically, the control current switch 235 is, for example, an n-channel MOSFET. The control current Ic is a current that branches off from a current, flowing between the node N1 and the node N3, at the node N3 and flows through the switch 231 and the control current switch 235. The control current switch 235 has a drain connected to the node N4 and a source connected to a node N5. Consequently, a drain voltage of the control current switch 235 is equal to that of the inverting input terminal of the operational amplifier 232 and thus is equal to the reference voltage Vr2 which is the voltage of the non-inverting input terminal of the operational amplifier 232. The control current Ic after flowing through the control current switch 235 is supplied to the dimmer 10 via a node N6.

The control current circuit 240 is configured to control a gate voltage of the control current switch 235 based on the feedback current If fed back from the constant current circuit 80. The control current circuit 240 includes, for example, a resistor 241, a voltage source VS3, and an operational amplifier 245.

The resistor 241 has one end (right end in FIG. 1) connected to the node N6 and the other end (left end in FIG. 1) connected to a node N7. The feedback current If fed back from the constant current circuit 80 and the control current Ic after flowing through the control current switch 235 flow through the resistor 241. The current after flowing through the resistor 241 is supplied as the dimmer current Id to the dimmer 10. In other words, the dimmer current Id that flows to the dimmer 10 includes the feedback current If and the control current Ic. When the dimmer current Id is large, a diode with a low forward voltage may be connected in parallel to the resistor 241 in order to clamp a voltage across the resistor 241.

The voltage source VS3 is configured to generate a voltage that is higher than a voltage of the node N7 by a reference voltage Vr3.

The operational amplifier 245 has a non-inverting input terminal connected to the voltage source VS3 so that the reference voltage Vr3 is supplied to this non-inverting input terminal from the voltage source VS3. On the other hand, the operational amplifier 245 has an inverting input terminal connected to the node N5. The operational amplifier 245 amplifies a difference between the reference voltage Vr3 and a voltage of the node N5 and outputs a voltage Voa2 to the clamp circuit 250.

Figure 2:
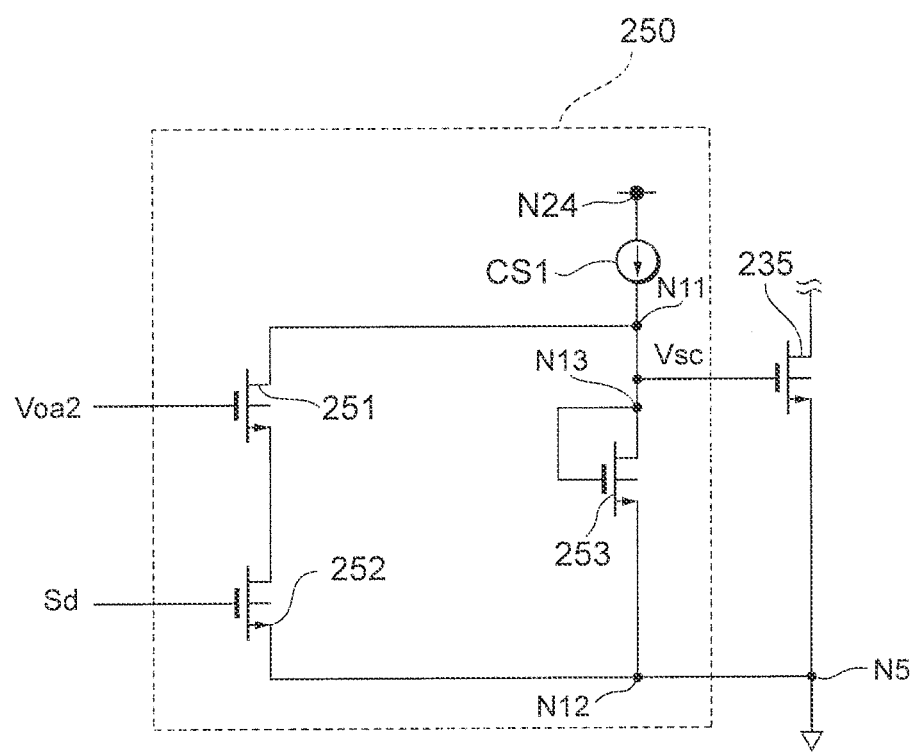
FIG. 2 is a circuit diagram showing a first embodiment example of a clamp circuit shown in FIG. 1.

FIG. 2 is a circuit diagram showing a first embodiment example of the clamp circuit 250 shown in FIG. 1. The clamp circuit 250 is configured to clamp the gate voltage of the control current switch 235 to a predetermined value. As shown in FIG. 2, the clamp circuit 250 includes, for example, a transistor 251, a transistor 252, a transistor 253, and a current source CS1.

The transistor 251 is, for example, an n-channel MOSFET and has a drain connected to a node N11 and a gate connected to an output terminal of the operational amplifier 245 of the control current circuit 240 shown in FIG. 1 so that the voltage Voa2 is supplied to the gate.

The transistor 252 is, for example, an n-channel MOSFET and has a drain connected to a source of the transistor 251 and a gate connected to an output terminal of the comparator 215 of the time period detection part 210 shown in FIG. 1 so that the detection signal Sd is input to the gate. The transistor 252 has a source connected to a node N12.

The transistor 253 is, for example, an n-channel MOSFET and has a drain and a gate both connected to a node N13 and a source connected to the node N12. The node N12 is at the same potential as the node N5 connected to the source of the control current switch 235.

The current source CS1 is configured to produce a constant current of a predetermined value. The current source CS1 has one end (upper end in FIG. 2) connected to a node N24 and the other end (lower end in FIG. 2) connected to the node N11.

In the clamp circuit 250 thus configured, a voltage equal to that of the nodes N11 and N13 is supplied as a switch control voltage Vsc to a gate of the control current switch 235 shown in FIGS. 1 and 2.

Next, a virtual control circuit 300 will be described for comparison with the control circuit 200 shown in FIG. 1.

Figure 3:
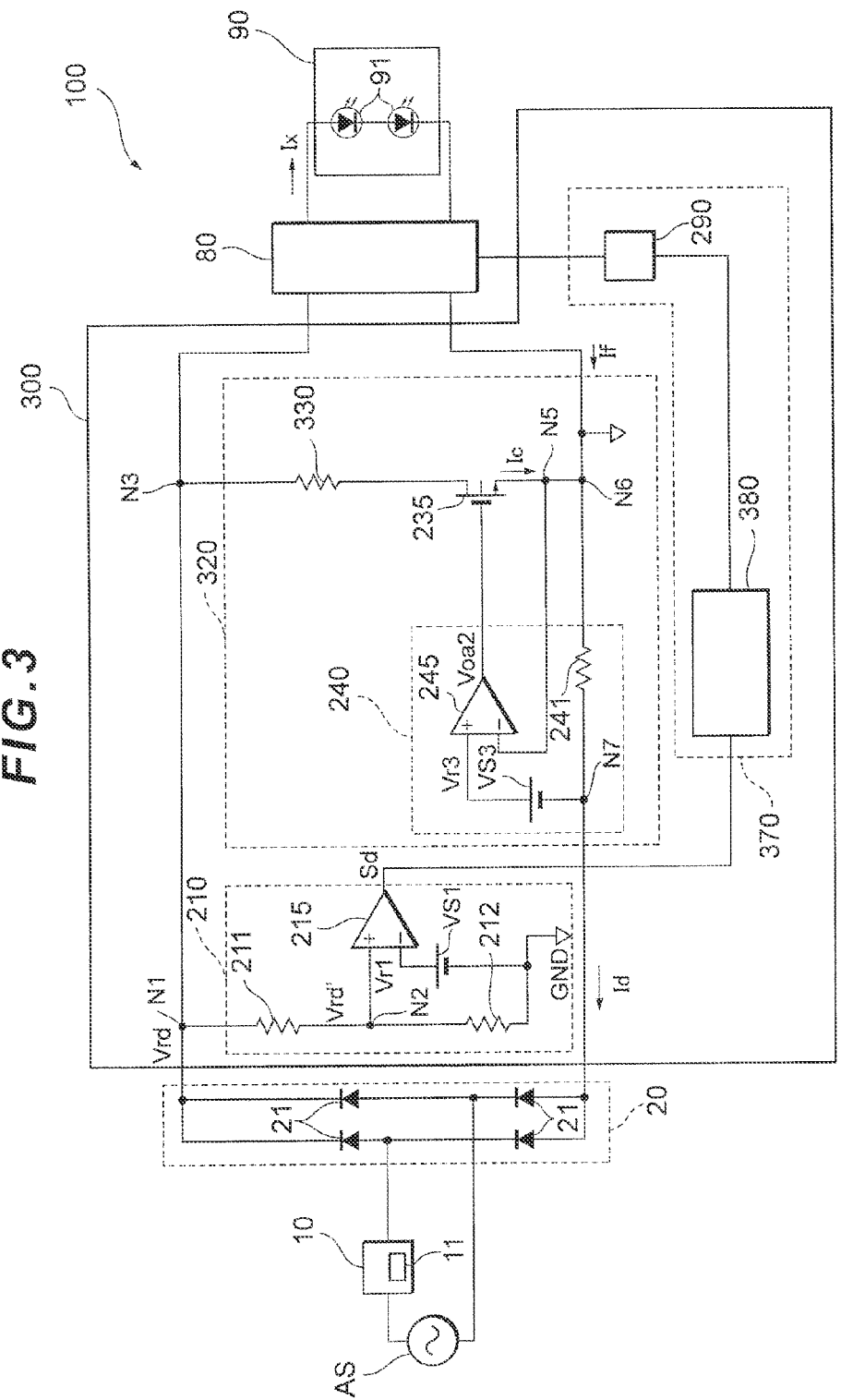
FIG. 3 is a block diagram for explaining an example of an illumination system including a virtual control circuit.

FIG. 3 is a block diagram showing an example of an illumination system 100 including the virtual control circuit 300. Unless otherwise stated, the same components as those of the illumination system 100 shown in FIG. 1 are denoted by the same reference symbols and a description thereof will be omitted as appropriate. As shown in FIG. 3, the virtual control circuit 300 includes a time period detection part 210, a dimmer current control part 320, and a load current control part 370.

The dimmer current control part 320 includes a resistor 330, a control current switch 235, and a control current circuit 240. In other words, the dimmer current control part 320 differs from the dimmer current control part 220 shown in FIG. 1 in that the dimmer current control part 320 includes the resistor 330 instead of the constant voltage circuit 230 shown in FIG. 1 and does not include the clamp circuit 250 shown in FIG. 1.

When a voltage value of a rectified drive voltage Vrd output from a rectifier 20 is relatively large, sufficient electric power is supplied to a constant current circuit 80 from the virtual control circuit 300. Therefore, a feedback current If fed back to the virtual control circuit 300 from the constant current circuit 80 has a value sufficiently greater than a holding current Ih of a switching device 11 of a dimmer 10.

On the other hand, when the voltage value of the rectified drive voltage Vrd is reduced, the electric power supplied to the constant current circuit 80 is also reduced. When the supplied electric power is not sufficient, electric power stored in a capacitor (not shown) provided in the constant current circuit 80 is supplied to an LED illumination 90. Since the electric power stored in this capacitor may differ per period of the rectified drive voltage Vrd, the feedback current If fed back to the virtual control circuit 300 after flowing through the LED illumination 90 may vary, i.e. increase and decrease.

Since the dimmer current control part 320 does not include the clamp circuit 250 shown in FIG. 1, a voltage Voa2 output from an operational amplifier 245 of the control current circuit 240 is input to a gate of the control current switch 235. The output of the operational amplifier 245 is negatively fed back to an inverting input terminal of the operational amplifier 245 via the control current switch 235. Therefore, the voltage Voa2 of the operational amplifier 245 is controlled by the operation of the operational amplifier 245 so that a voltage of the inverting input terminal of the operational amplifier 245 becomes equal to that of a non-inverting input terminal of the operational amplifier 245.

Figure 4:
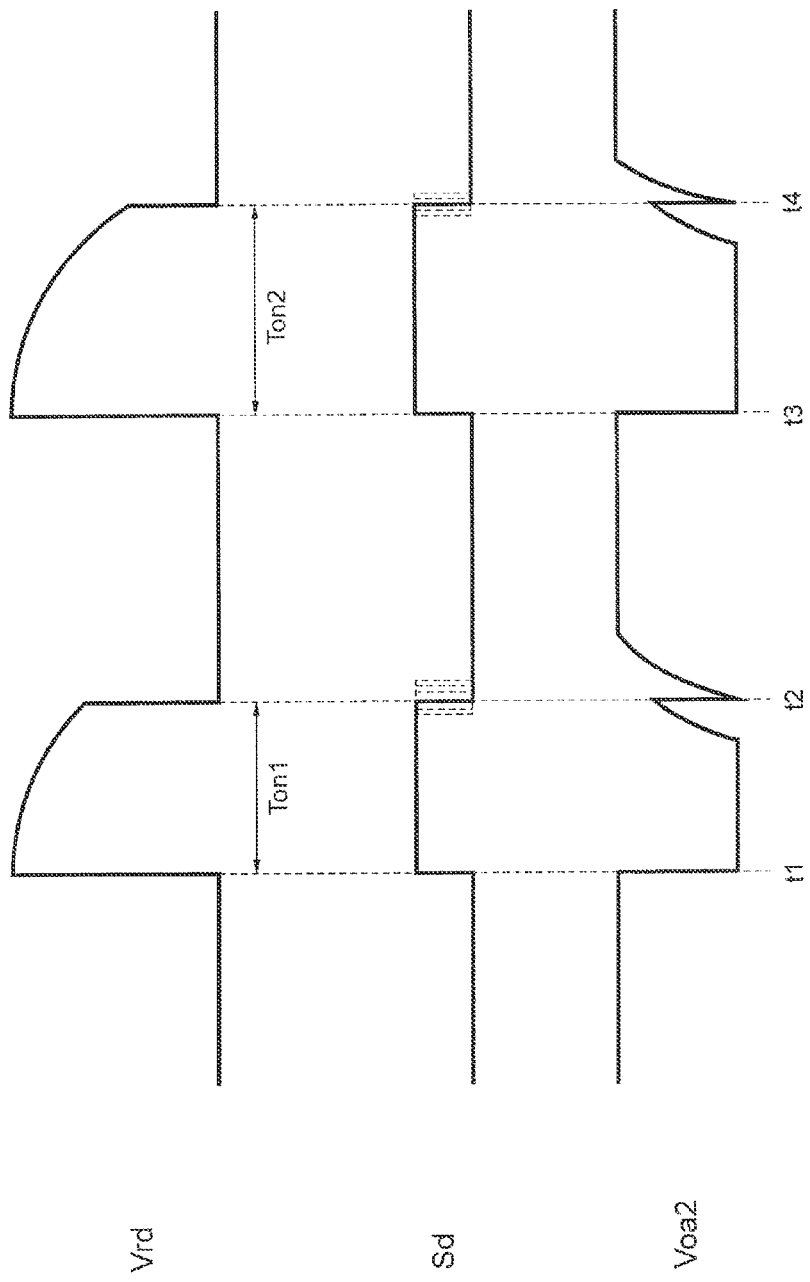
FIG. 4 is a signal waveform diagram for explaining the operation of a dimmer current control part shown in FIG. 3.

FIG. 4 is a signal waveform diagram for explaining the operation of the virtual dimmer current control part 320 shown in FIG. 3. Since the voltage Voa2 of the operational amplifier 245 changes so that the inverting input terminal and the non-inverting input terminal of the operational amplifier 245 have the same voltage, if, for example, the feedback current If shown in FIG. 3 varies around time t2 at which the rectified drive voltage Vrd drops as shown in FIG. 4, a voltage of a node N7 shown in FIG. 3 changes due to this feedback current If.

Therefore, the voltage Voa2 supplied to the gate of the control current switch 235 shown in FIG. 3 reaches a predetermined value while fluctuating.

While the voltage Voa2 is unstable around time t2, a dimmer current Id including a control current Ic flowing through the control current switch 235 shown in FIG. 3 and the feedback current If may fall below the holding current Ih. In this case, the switching device 11 of the dimmer 10 shown in FIG. 3 is turned off at a timing different from that controlled by a controller of the dimmer 10. Therefore, as shown in FIG. 4, in the rectified drive voltage Vrd, for example, its on-time Ton2 from time t3 to time t4 differs from its on-time Ton1 from time t1 to time t2 (Ton2≠Ton1).

As a result, as shown in FIG. 4, in a detection signal Sd of a comparator 215 of the time period detection part 210, so-called jitter occurs in which the time period of H level varies per period so that the level changes from H level to L level at an earlier timing or at a delayed timing. If the on-time of the rectified drive voltage Vrd varies as described above, light of the LED illumination 90 shown in FIG. 3 looks like flickering.

On the other hand, as shown in FIG. 1, the control circuit 200 includes the time period detection part 210 configured to detect a time period in which the voltage value of the rectified drive voltage Vrd is less than or equal to the predetermined value. Herein, when the voltage value of the rectified drive voltage Vrd is less than or equal to the predetermined value, electric power stored in an electricity storage means such as a capacitor is supplied to the LED illumination 90. Therefore, the feedback current If fed back to the dimmer 10 from the LED illumination 90 may vary largely so that the dimmer current Id flowing to the dimmer 10 becomes unstable. Accordingly, using the time period detection part 210 to detect a time period in which the voltage value of the rectified drive voltage Vrd is less than or equal to the threshold value Vth1, it is possible to detect a time period in which the feedback current If varies largely, i.e. is unstable.

The control current circuit 240 shown in FIG. 1 is configured to control the gate voltage of the control current switch 235 based on the feedback current If while the voltage value of the rectified drive voltage Vrd is greater than the predetermined value. Consequently, the control current Ic based on the feedback current If can be supplied to the dimmer 10 other than in the time period in which the feedback current If is unstable.

Specifically, when the voltage value of the rectified drive voltage Vrd output from the rectifier 20 is relatively large, the detection signal Sd of the comparator 215 of the time period detection part 210 is H level so that the transistor 252 shown in FIG. 2 is turned on. In this event, the feedback current If fed back to the control circuit 200 from the constant current circuit 80 has a value sufficiently greater than the holding current Ih of the switching device 11 of the dimmer 10.

When the voltage value of the rectified drive voltage Vrd starts to decrease, while the detection signal Sd of the comparator 215 remains at H level, the feedback current If fed back to the control circuit 200 decreases. The output of the operational amplifier 245 shown in FIG. 1 is negatively fed back to the inverting input terminal of the operational amplifier 245 via the transistor 251, the transistor 252, and the node N5 shown in FIG. 2. Therefore, the voltage Voa2 of the operational amplifier 245 is controlled by the operation of the operational amplifier 245 so that the voltage of the inverting input terminal of the operational amplifier 245 becomes equal to that of the non-inverting input terminal of the operational amplifier 245.

Figure 5:
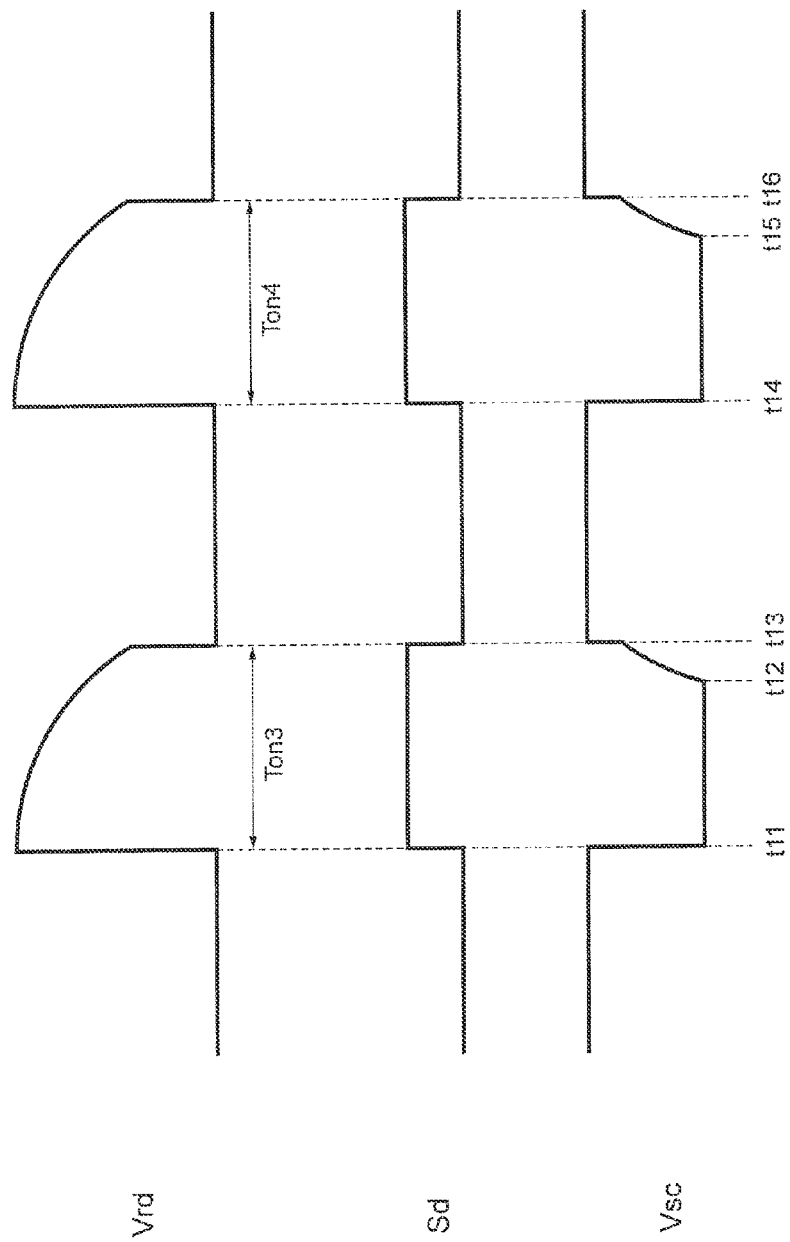
FIG. 5 is a signal waveform diagram for explaining the operation of a dimmer current control part shown in FIG. 1.

FIG. 5 is a signal waveform diagram for explaining the operation of the dimmer current control part 220 shown in FIG. 1. Since the voltage Voa2 of the operational amplifier 245 changes so that the inverting input terminal and the non-inverting input terminal of the operational amplifier 245 have the same voltage, the switch control voltage Vsc supplied to the gate of the control current switch 235 gradually increases, for example, at time t12 and time t15 as shown in FIG. 5. Consequently, the control current Ic is supplied, in addition to the feedback current If, to the dimmer 10 shown in FIG. 1.

Example 1

For example, when the holding current Ih of the switching device 11 of the dimmer 10 shown in FIG. 1 is 50 mA, the resistance value of the resistor 241 shown in FIG. 1 is set to 4Ω and the reference voltage Vr3 of the voltage source VS3 shown in FIG. 1 is set to 0.2V. In this case, since a current that flows through the resistor 241 is 50 mA by the operation of the control current circuit 240, it is possible to supply a dimmer current Id of 50 mA or more to the dimmer 10.

The dimmer current control part 220 shown in FIG. 1 is configured so that while the voltage value of the rectified drive voltage Vrd is less than or equal to the threshold value Vth1, the control current Ic to the dimmer 10 shown in FIG. 1 is greater than or equal to the holding current Ih of the switching device 11 of the dimmer 10. Consequently, even when the feedback current If is unstable, the control current Ic greater than or equal to the holding current Ih is supplied to the dimmer 10 shown in FIG. 1 so that the switching device 11 of the dimmer 10 is maintained in a conducting state. Therefore, variation in on-time per period of the rectified drive voltage Vrd, i.e. variation in pulse width per period of the rectified drive voltage Vrd, becomes small.

In other words, as the result that the conducting state of the switching device 11 of the dimmer 10 shown in FIG. 1 is maintained, for example, an on-time Ton3 from time t11 to time t13 and an on-time Ton4 from time t14 to time t16 in the rectified drive voltage Vrd become equal or substantially equal to each other as shown in FIG. 5.

Specifically, when the voltage value of the rectified drive voltage Vrd is reduced to less than or equal to the threshold value Vth1, the detection signal Sd of the comparator 215 of the time period detection part 210 shown in FIG. 1 becomes L level. In this event, the transistor 252 shown in FIG. 2 changes from on to off so that a current does not flow through the transistors 251 and 252 shown in FIG. 2 regardless of the voltage Voa2 of the operational amplifier 245. Consequently, while the voltage value of the rectified drive voltage Vrd is less than or equal to the threshold value Vth1, the control of the control current Ic by the control current circuit 240 shown in FIG. 1 is stopped.

In this event, the switch control voltage Vsc shown in FIG. 2 is clamped to a predetermined value corresponding to a current of the current source CS1. As shown in FIG. 5, for example, the switch control voltage Vsc is maintained at a predetermined value between time t13 and time t14. Since the clamp circuit 250 shown in FIG. 1 clamps the switch control voltage Vsc as a gate voltage of the control current switch 235 to the predetermined value while the voltage value of the rectified drive voltage Vrd is less than or equal to the threshold value Vth1, the control current Ic as a drain current of the control current switch 235 shown in FIG. 1 is fixed to a predetermined value.

The constant voltage circuit 230 shown in FIG. 1 is configured so that the voltage of the node N4, i.e. the drain voltage of the control current switch 235 shown in FIG. 1, becomes less than or equal to the reference voltage Vr2 of the voltage source VS2. Consequently, compared to a voltage of the node N3 shown in FIG. 1 to which the rectified drive voltage Vrd that can be instantaneously several hundred volts is applied, the drain voltage of the control current switch 235 shown in FIG. 1 can be reduced to a relatively low value.

Since the drain voltage of the control current switch 235 shown in FIG. 1 can be reduced to the relatively low value by the constant voltage circuit 230 shown in FIG. 1, a low-voltage control current switch can be used as the control current switch 235. In this case, the control current switch 235 can respond to a load change at high speed and can be driven with low electric power, and therefore, it is possible to reduce the power consumption. Further, the low-voltage control current switch 235 can be easily formed in an IC chip.

While there is shown an example in which the control circuit 200 shown in FIG. 1 includes the clamp circuit 250 shown in FIG. 2, the configuration is not limited thereto. The clamp circuit 250 is satisfactory if it is configured to clamp the gate voltage of the control current switch 235 shown in FIG. 1 to a predetermined value while the voltage value of the rectified drive voltage Vrd is less than or equal to the threshold value Vth1.

Figure 6:
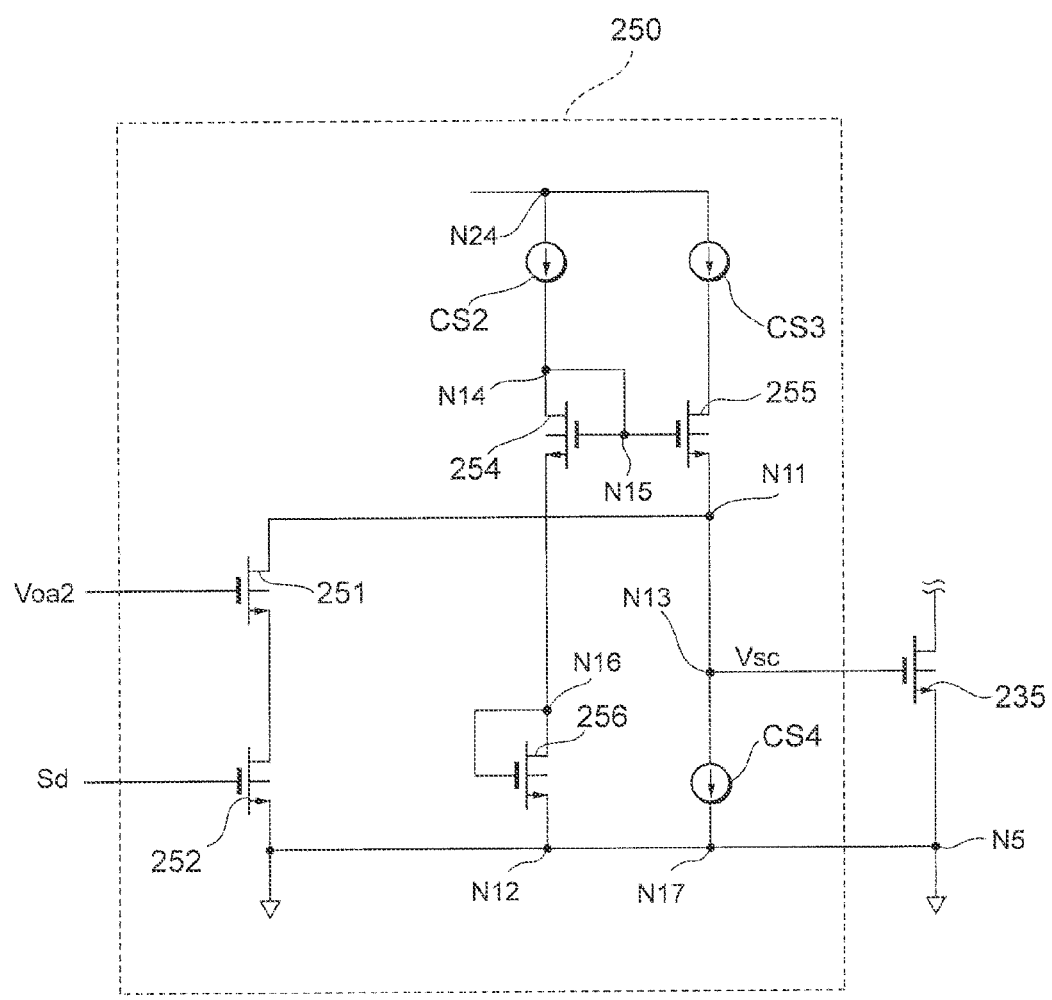
FIG. 6 is a circuit diagram showing a second embodiment example of a clamp circuit shown in FIG. 1.

FIG. 6 is a circuit diagram showing a second embodiment example of the clamp circuit 250 shown in FIG. 1. As shown in FIG. 6, the clamp circuit 250 includes, for example, a transistor 251, a transistor 252, a transistor 256, a transistor 254, a transistor 255, a current source CS2, a current source CS3, and a current source CS4.

The transistor 251 is, for example, an n-channel MOSFET and has a drain connected to a node N11 and a gate connected to an output terminal of the operational amplifier 245 of the control current circuit 240 shown in FIG. 1 so that the voltage Voa2 is supplied to the gate.

The transistor 252 is, for example, an n-channel MOSFET and has a drain connected to a source of the transistor 251 and a gate connected to an output terminal of the comparator 215 of the time period detection part 210 shown in FIG. 1 so that the detection signal Sd is input to the gate. The transistor 252 has a source connected to a node N12.

The transistor 256 is, for example, an n-channel MOSFET and has a drain and a gate both connected to a node N16 and a source connected to the node N12.

The transistor 254 is, for example, an n-channel MOSFET and has a drain connected to a node N14, a gate connected to a node N15, and a source connected to the node N16.

The current source CS2 is configured to produce a predetermined constant current. The current source CS2 has one end (upper end in FIG. 6) connected to a node N24 and the other end (lower end in FIG. 6) connected to the node N14 and the node N15.

The transistor 255 is, for example, an n-channel MOSFET and has a gate connected to the node N15 and a source connected to the node N11.

The current source CS3 is configured to produce a predetermined constant current. The current source CS3 has one end (upper end in FIG. 6) connected to the node N24 and the other end (lower end in FIG. 6) connected to a drain of the transistor 255.

The current source CS4 is configured to produce a predetermined constant current. The current source CS4 has one end (upper end in FIG. 6) connected to a node N13 and the other end (lower end in FIG. 6) connected to a node N17.

In the clamp circuit 250 thus configured, a voltage equal to that of the nodes N11 and N13 is supplied as a switch control voltage Vsc to a gate of the control current switch 235 shown in FIGS. 1 and 6.

Next, the load current control part 270 of the control circuit 200 will be described.

Figure 7:
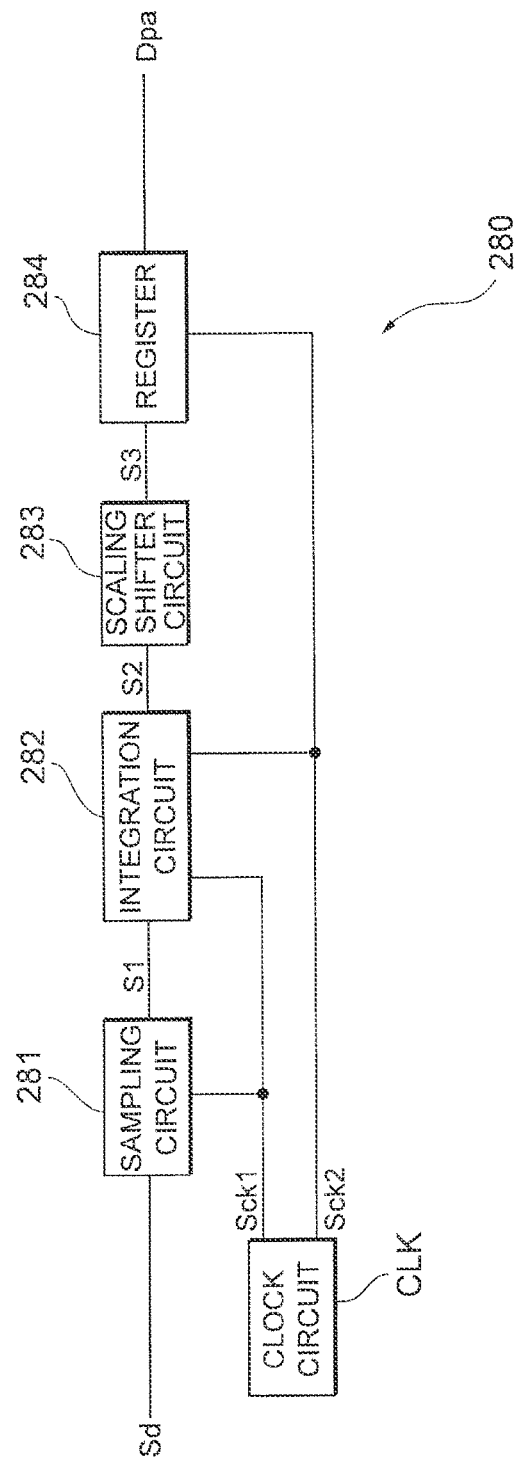
FIG. 7 is a block diagram showing an example of a signal processing circuit shown in FIG. 1.

FIG. 7 is a block diagram showing an example of the signal processing circuit 280 shown in FIG. 1. As shown in FIG. 7, the signal processing circuit 280 is configured to calculate a pulse density of the detection signal Sd output from the time period detection part 210 shown in FIG. 1.

The signal processing circuit 280 can be configured using, for example, a decimation filter. As the decimation filter, it is possible to use an $n^{th}$-order (n is a positive integer) sinc filter, a FIR (Finite Impulse Response) filter, or the like.

The signal processing circuit 280 includes, for example, a sampling circuit 281, an integration circuit 282, a scaling shifter circuit 283, and a register 284.

The detection signal Sd of the comparator 215 shown in FIG. 1 and a clock signal Sck1 of a predetermined frequency from a clock circuit CLK are input to the sampling circuit 281. Per period of the clock signal Sck1, the sampling circuit 281 samples the detection signal Sd and outputs a signal S1. Herein, the detection signal Sd output from the time period detection part 210 shown in FIG. 1 represents discrete values obtained by A/D conversion of voltage values, as continuous values, of the rectified drive voltage Vrd. The time period detection part 210 uses, for example, a one-bit output comparator, thereby carrying out A/D conversion. Accordingly, the sampling circuit 281 outputs one-bit signals S1 whose sampling frequency is the predetermined frequency of the clock signal Sck1.

The signal S1 of the sampling circuit 281 is input to the integration circuit 282. The integration circuit 282 is, for example, an integration circuit of (M+N) bits (M and N are positive integers) and integrates the values of the signals S1 in a predetermined term. Herein, when the detection signal Sd represents, for example, one-bit discrete values, it is possible to use a counter circuit as an integration circuit for integration, i.e. counting. For example, given that H-level signal S1 is "1" and that L-level signal S1 is "0", the integration circuit 282 integrates the number of "1". Further, the clock signal Sck1 and a clock signal Sck2 are input from the clock circuit CLK to the integration circuit 282. The clock signal Sck2 is a signal produced by dividing the clock signal Sck1 and has a $\frac{1}{2}^{(M+N)}$ frequency with respect to the frequency of the clock signal Sck1. Per period of the clock signal Sck2, the integration circuit 282 outputs an integrated value as a signal S2 and resets the integrated value.

Consequently, H-level signals S1 are integrated in each period of the clock signal Sck2 so that an (M+N)-bit signal S2 indicating an integrated value is output.

The signal S2 of the integration circuit 282 is input to the scaling shifter circuit 283. The scaling shifter circuit 283 outputs a signal S3 which is the (M+N)-bit signal S2 shifted to the right by M bits. Consequently, an N-bit signal S3 obtained by normalizing the numerical scale of the signal S2 is output.

The signal S3 of the scaling shifter circuit 283 and the clock signal Sck2 from the clock circuit CLK are input to the register 284. The register 284 holds the input signal S3 and outputs the signal S3 as N-bit phase angle data Dpa per period of the clock signal Sck2.

The signal processing circuit 280 shown in FIG. 7 is an example of the simplest circuit equivalent to a primary sinc filter. Generally, a transfer function H of a sinc filter is given by $H=\{(1-Z^{-m})/(1-Z^{-1})\}^n$ (m and n are positive integers). For increasing the response speed of the signal processing circuit 280, a high-order sinc filter with smaller m and n greater than or equal to 2 may be used.

Figure 8:
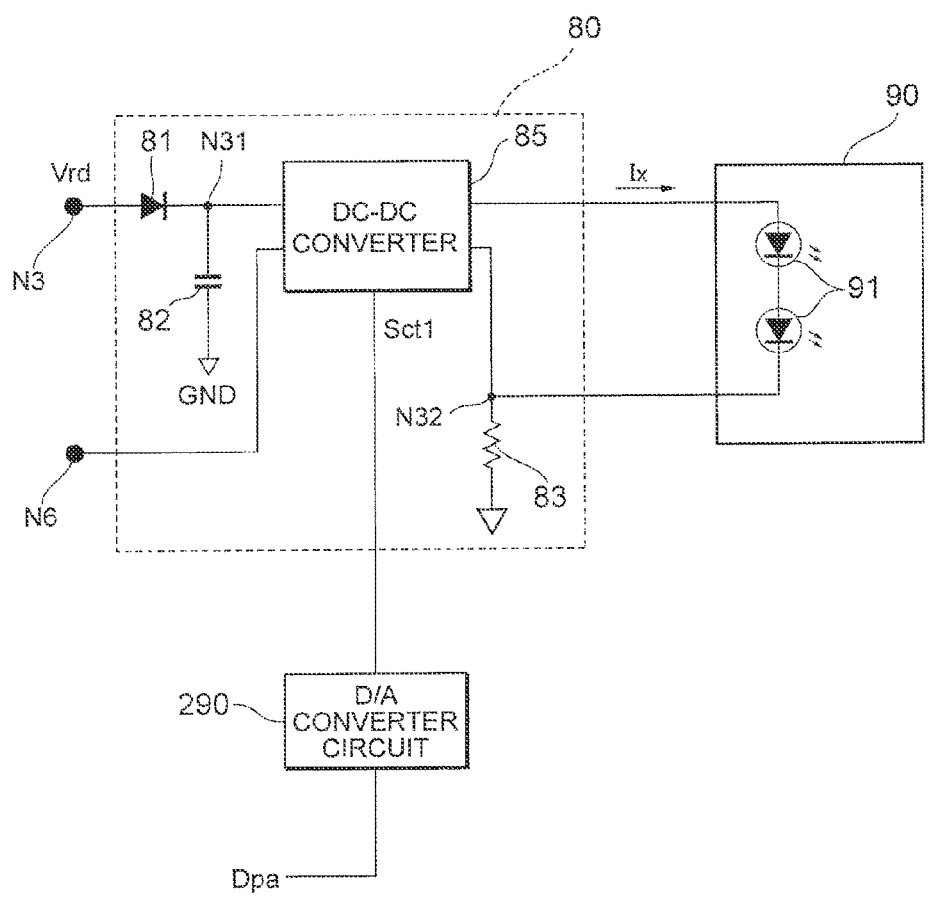
FIG. 8 is a block diagram showing an example of a constant current circuit and a D/A converter circuit shown in FIG. 1.

FIG. 8 is a block diagram showing an example of the constant current circuit 80 and the D/A converter circuit 290 shown in FIG. 1. As shown in FIG. 8, the constant current circuit 80 includes, for example, a diode 81, a capacitor 82, a resistor 83, and a DC-DC converter 85.

The diode 81 has an anode connected to the node N3 shown in FIGS. 1 and 8 and a cathode connected to a node N31. The capacitor 82 has one end (upper end in FIG. 8) connected to the node N31 and the other end (lower end in FIG. 8) connected to a ground GND. The resistor 83 has one end (upper end in FIG. 8) connected to a node N32 and the other end (lower end in FIG. 8) connected to a ground GND.

The DC-DC converter 85 is configured to supply a predetermined constant current to the LED illumination 90 shown in FIGS. 1 and 8. The rectified drive voltage Vrd of the node N3 is input to the DC-DC converter 85 via the diode 81 and the capacitor 82. The DC-DC converter 85 increases or reduces this voltage to a predetermined voltage value to produce a constant voltage. For example, when the DC-DC converter 85 is of a step-down type, it can be configured by including a switch, a choke coil, and a smoothing capacitor. Switching of the switch is controlled based on a later-described control signal Sct1. When the switch is on, a current flows through the choke coil by the voltage input to the DC-DC converter 85 so that this voltage is output. Further, energy is stored in the choke coil, while electric charges are stored in the smoothing capacitor. On the other hand, when the switch is switched from on to off, the choke coil generates an electromotive force to maintain the current and releases the stored energy to output a current. Further, the smoothing capacitor smoothes the voltage by the stored electric charges. Consequently, a predetermined voltage based on the switching is output and supplied to the LED illumination 90 so that an LED current becomes a predetermined constant current.

The D/A converter circuit 290 is configured to produce the control signal Sct1 described above. The N-bit phase angle data Dpa of the signal processing circuit 280 shown in FIG. 7 is input to the D/A converter circuit 290. The D/A converter circuit 290 produces, for example, a pulse width modulation (PWM) signal based on the phase angle data Dpa and outputs this signal as the control signal Sct1. More specifically, the D/A converter circuit 290 outputs the control signal Sct1 having a pulse whose pulse width is changed according to the value of the phase angle data Dpa without changing the pulse period. In other words, the control signal Sct1 becomes a signal whose duty cycle differs according to the value of the phase angle data Dpa.

The DC-DC converter 85 controls the switching according to the pulse width, i.e. the duty cycle, of a pulse included in the control signal Sct1, thereby changing the value of constant current supplied to the LED illumination 90. Consequently, the brightness of the LED illumination 90 is adjusted by the phase angle data Dpa.

While there is shown an example in which the D/A converter circuit 290 shown in FIG. 8 produces the control signal Sct1 directly from the phase angle data Dpa, the configuration is not limited thereto. Depending on a combination of the dimmer 10 and the LED illumination 90, the phase angle data Dpa may not have a linear relationship with the brightness of the LED illumination 90. In this case, the D/A converter circuit 290 may have a conversion table and, using this conversion table, may carry out linear conversion of the phase angle data Dpa to obtain a linear-converted value, thereby producing the control signal Sct1 from this linear-converted value.

Next, the load current control part 370 of the virtual control circuit 300 shown in FIG. 3 will be described for comparison with the load current control part 270 of the control circuit 200 shown in FIG. 1.

As shown in FIG. 3, the load current control part 370 includes a signal processing circuit 380 and a D/A converter circuit 290. In other words, the load current control part 370 differs from the load current control part 270 shown in FIG. 1 in that the load current control part 370 includes the signal processing circuit 380 instead of the signal processing circuit 280 shown in FIG. 7.

Figure 9:
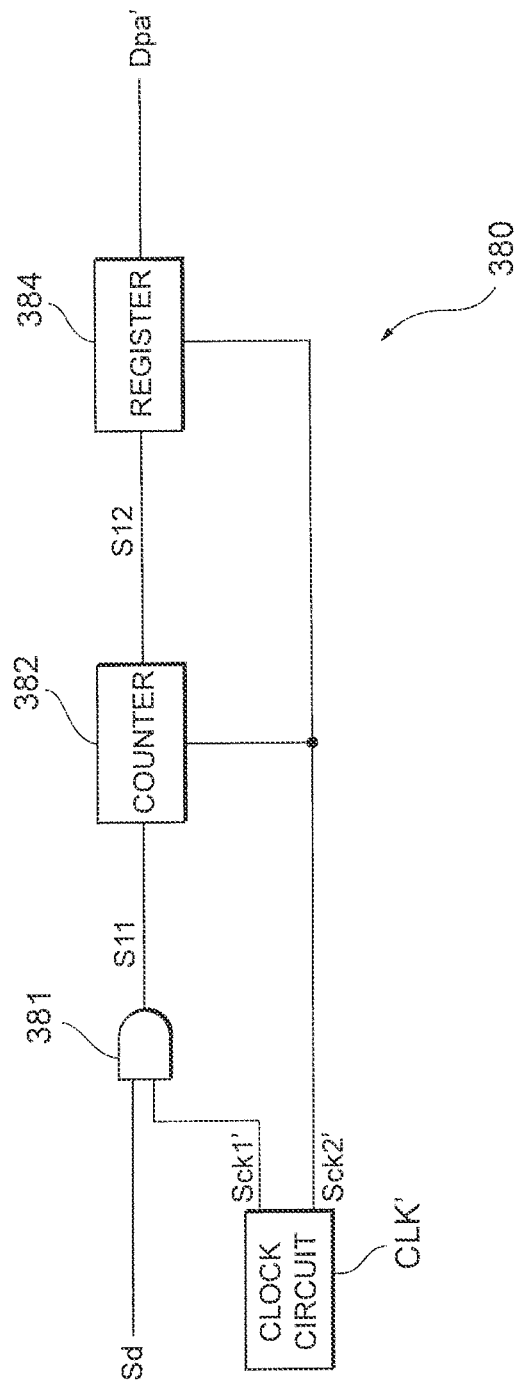
FIG. 9 is a block diagram showing an example of a signal processing circuit shown in FIG. 3.

FIG. 9 is a block diagram showing an example of the signal processing circuit 380 shown in FIG. 3. As shown in FIG. 9, the signal processing circuit 380 includes an AND circuit 381, a counter 382, and a register 384.

The detection signal Sd of the comparator 215 shown in FIG. 3 and a clock signal Sck1' of a predetermined frequency from a clock circuit CLK' are input to the AND circuit 381. The AND circuit 381 performs a logical product operation of the detection signal Sd and the clock signal Sck1' and outputs a signal S11. In other words, the signal S11 of the AND circuit 381 becomes H level when both the detection signal Sd and the clock signal Sck1' are H level, while it becomes L level when at least one of the detection signal Sd and the clock signal Sck1' is L level.

The signal S11 of the AND circuit 381 is input to the counter 382. The counter 382 is, for example, an N-bit counter and counts the number of H-level signals S11 in a predetermined term. Further, a clock signal Sck2' is input from the clock circuit CLK' to the counter 382. Per period of the clock signal Sck2', the counter 382 outputs a count value as a signal S12 and resets the count value. Consequently, H-level signals S11 are counted in each period of the clock signal Sck2' so that an N-bit signal S12 indicating a count value is output.

The signal S12 of the counter 382 and the clock signal Sck2' from the clock circuit CLK' are input to the register 384. The register 384 holds the input signal S12 and outputs the signal S12 as phase angle data Dpa' per period of the clock signal Sck2'.

Figure 10:
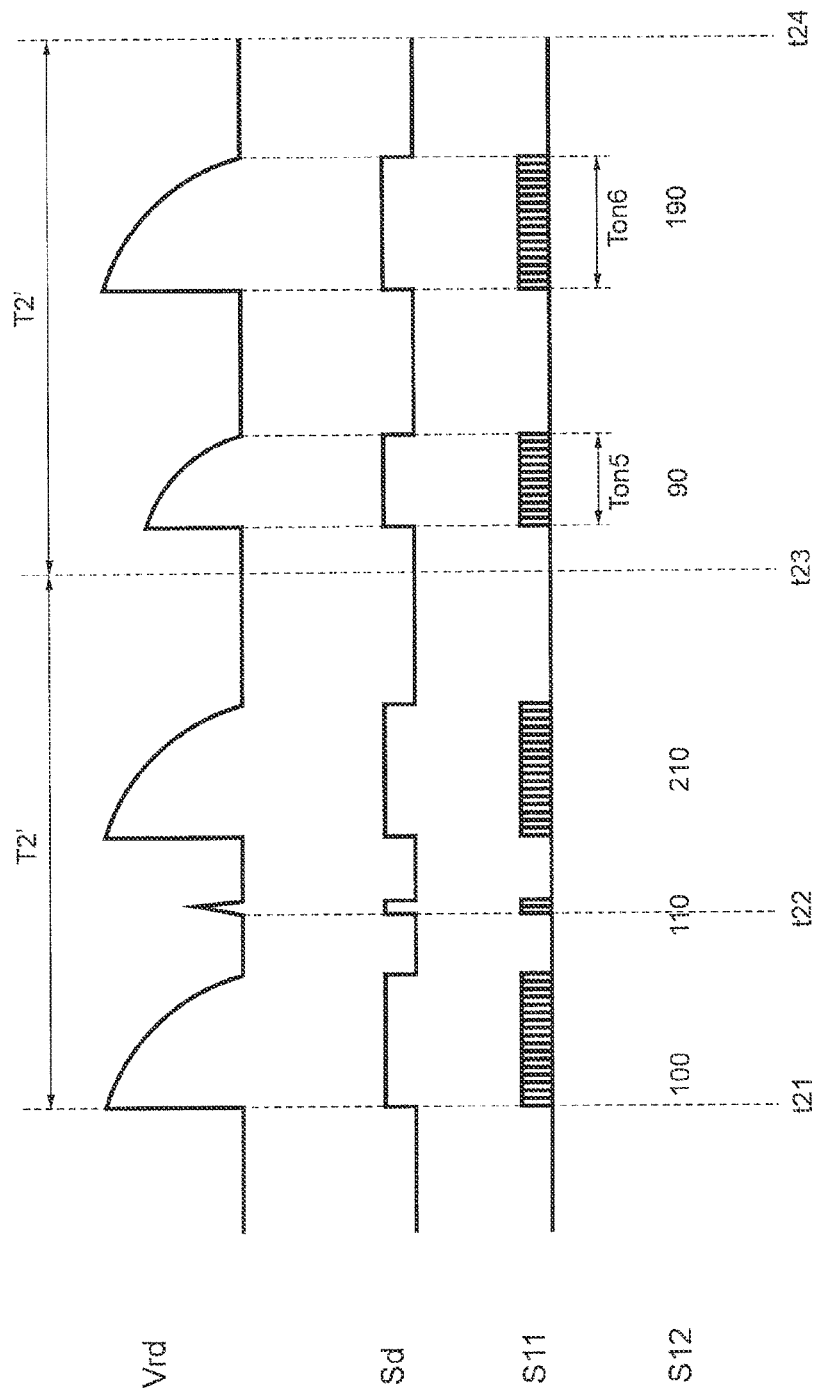
FIG. 10 is a signal waveform diagram for explaining the operation of the signal processing circuit shown in FIG. 9.

FIG. 10 is a signal waveform diagram for explaining the operation of the signal processing circuit 380 shown in FIG. 9. In FIG. 10, count values of the counter 382 are shown by way of example in the lowermost row. As shown in FIG. 10, while the voltage value of the rectified drive voltage Vrd is greater than the threshold value Vth1, the detection signal Sd of the comparator 215 shown in FIG. 3 is H level and the signal S11 of the AND circuit 381 shown in FIG. 9 becomes H level per period of the clock signal Sck1'. The counter 382 shown in FIG. 9 counts the number of H-level pulses of the signals S11 and outputs a count value as the signal S12 per period T2' of the clock signal Sck2'. The phase angle data Dpa' of the register 384 is N-bit data indicating the count value.

Comparative Example 1

For example, when the frequency of the clock signal Sck1' is 20 kHz and the frequency of the clock signal Sck2' is a frequency of an AC source AS shown in FIG. 3, for example, 50 Hz, a maximum value of the count value is 400 (=20 k/50) and the period T2' per which the count value of the counter 382 is output and the phase angle data Dpa' is output is 20 ms (=1/50). For example, when the on-phase angle of the switching device 11 controlled by the controller of the dimmer 10 shown in FIG. 3 is 90 degrees, since the voltage value of the rectified drive voltage Vrd is greater than the threshold value Vth1 in a time period half the period of the rectified drive voltage Vrd, a theoretical count value (theoretical value) ought to be 200 (=400/2).

However, the rectified drive voltage Vrd may be affected by noise. As shown in FIG. 10, for example, if noise with a voltage value greater than the threshold value Vth1 occurs in the rectified drive voltage Vrd at time t22, the counter 382 shown in FIG. 9 counts the number of H-level pulses of the signals S11 during this time period so that this count value is reflected on the value of the phase angle data Dpa'. In this case, the value of the phase angle data Dpa' output at time t23 becomes, for example, 210.

Further, a time period in which the voltage value of the rectified drive voltage Vrd is greater than the threshold value Vth1, i.e. the on-time of the rectified drive voltage Vrd, may vary due to offset variation of the rectifier 20 shown in FIG. 3, or the like. Although the on-phase angle of the switching device 11 of the dimmer 10 shown in FIG. 3 is not changed and remains at 90 degrees, as seen, for example, between time t23 and time t24, an on-time Ton5 and an on-time Ton6 of the rectified drive voltage Vrd may differ from each other due to offset variation of the rectifier 20 shown in FIG. 3 (Ton5≠Ton6). The counter 382 shown in FIG. 9 counts the numbers of H-level pulses of the signals S11 respectively corresponding to the on-time Ton5 and the on-time Ton6 so that these count values are reflected on the value of the phase angle data Dpa'. In this case, the value of the phase angle data Dpa' output at time t24 becomes, for example, 190.

As described above, since the signal processing circuit 380 shown in FIG. 9 counts the on-time of the rectified drive voltage Vrd and outputs the phase angle data Dpa' per period of the rectified drive voltage Vrd, the value of the phase angle data Dpa' tends to be affected by variation in each period of the rectified drive voltage Vrd.

On the other hand, as shown in FIG. 1, the control circuit 200 includes the time period detection part 210 configured to output the detection signal Sd including a pulse whose pulse width is based on a time period in which the voltage value of the rectified drive voltage Vrd is greater than the predetermined value, and the load current control part 270 configured to control the load current Ix to the LED illumination 90 based on the pulse density of the detection signal Sd in the predetermined term. Herein, the time period in which the voltage value of the rectified drive voltage Vrd is greater than the predetermined value is determined based on the on-phase angle of the switching device 11 of the dimmer 10. However, the time period in which the voltage value of the rectified drive voltage Vrd is greater than the predetermined value may vary per period due to the influence of noise, offset variation of the rectifier 20, or the like. On the other hand, even if the time period in which the voltage value of the rectified drive voltage Vrd is greater than the predetermined value varies per period, variation per period of the rectified drive voltage Vrd is canceled or reduced in terms of the rate or ratio of pulses of the detection signal Sd included in the predetermined term, i.e. the pulse density of the detection signal Sd in the predetermined term. Therefore, since the load current control part 270 controls the load current Ix to the LED illumination 90 based on the pulse density of the detection signal Sd, the load current Ix is not easily affected by noise or pulse width variation of the rectified drive voltage Vrd so that the load current Ix based on the on-phase angle of the switching device 11 can be supplied to the LED illumination 90.

The signal processing circuit 280 shown in FIGS. 1 and 7 is configured to calculate a pulse density of the detection signal Sd in the predetermined term based on the detection signal Sd. Accordingly, it is possible to use, for example, a decimation filter that up-samples the detection signal Sd at a relatively high sampling frequency, then integrates sampled signals, then down-samples integrated signals at a relatively low sampling frequency, and then normalizes the numerical scale for conversion into a low-speed multi-bit signal.

FIG. 11 is a signal waveform diagram for explaining the operation of the signal processing circuit 280 shown in FIG. 7. In FIG. 11, integrated values of the integration circuit 282 are shown by way of example in the second row from bottom and values of the phase angle data Dpa are shown by way of example in the lowermost row. As shown in FIG. 11, while the voltage value of the rectified drive voltage Vrd is greater than the threshold value Vth1, the detection signal Sd of the comparator 215 shown in FIG. 1 is H level and the sampling circuit 281 shown in FIG. 7 samples a value, i.e. H level, of the detection signal Sd per period of the clock signal Sck1 and outputs it as the signal S1. The integration circuit 282 shown in FIG. 7 integrates the signal S1 per period of the clock signal Sck1 and outputs an integrated value as the signal S2 per period T2 of the clock signal Sck2. The scaling shifter circuit 283 shown in FIG. 7 right-shifts the signal S2 of the integration circuit 282 by M bits and outputs the signal S3. The phase angle data Dpa of the register 284 shown in FIG. 7 is holding data as the signal S3. In this manner, the phase angle data Dpa indicating a pulse density of the detection signal Sd is calculated per period T2 of the clock signal Sck2.

Example 2

For example, N=9, M=4, and the frequency of the clock signal Sck1 is 20 kHz, the frequency of the clock signal Sck2 is 2.44 Hz (=20 kHz/$2^{(M+N)}$=20 kHz$2^{13}$). Further, a maximum value of the integrated value of the integration circuit 282 shown in FIG. 7 is 8192 (=$2^{(M+N)}$=$2^{13}$) and a maximum value of the phase angle data Dpa is 512 (=$2^N$=$2^9$). Further, a period per which the integrated value of the integration circuit 282 shown in FIG. 7 is output and the phase angle data Dpa is output is 409.6 ms (=$2^{(M+N)}$/20 kHz=$2^{13}$/20 kHz).

The period T2 of the clock signal Sck2 is 409.6 ms (=$2^{(M+N)}$/20 kHz=$2^{13}$/20 kHz) and thus is set longer than a period, such as $\frac{1}{50}$ seconds or $\frac{1}{60}$ seconds, of the AC source AS shown in FIG. 1. Consequently, since the pulse density of the detection signal Sd is calculated in the term longer than the period of the rectified drive voltage Vrd, it is possible to reduce the influence of variation that occurs per period or half period of the rectified drive voltage Vrd.

Herein, when the on-phase angle of the switching device 11 controlled by the controller of the dimmer 10 shown in FIG. 1 is 90 degrees as in Comparative Example 1, since the voltage value of the rectified drive voltage Vrd is greater than the threshold value Vth1 in a time period half the period of the rectified drive voltage Vrd, the integrated value is 4096 (=8192/2). In consideration that, in Example 2, the period of the integration, i.e. the period T2 of the clock signal Sck2, is 20.48 (=409.6 ms/20 ms) times the period T2' of the clock signal Sck2' of Comparative Example 1, 20.48 times the theoretical count value (theoretical value) of Comparative Example 1 is calculated to 4096 (=200×20.48) which is the same as the integrated value described above.

As shown in FIG. 11, if, as seen, for example, between time t31 and time t32, noise with a voltage value greater than the threshold value Vth1 occurs in the rectified drive voltage Vrd or an on-time Ton5 and an on-time Ton6 of the rectified drive voltage Vrd differ from each other, this influence is reflected on the integrated value of the integration circuit 282 shown in FIG. 7. However, since the signal processing circuit 280 shown in FIGS. 1 and 7 outputs the signal S2 per period T2 of the clock signal Sck2 and outputs the phase angle data Dpa by multiplying the integrated value of the signal S2 by $\frac{1}{16}$ (=$\frac{1}{2}^M$=$\frac{1}{2}^4$), the influence of variation of the rectified drive voltage Vrd is canceled or reduced. Therefore, the signal S2 of the integration circuit 282 output per period T2 of the clock signal Sck2 becomes, for example, the theoretical value of 4096 and the phase angle data Dpa becomes, for example, 256.

Since the load current control part 270 shown in FIG. 1 controls the load current Ix to the LED illumination 90 shown in FIG. 1 based on the pulse density of the detection signal Sd, when the on-phase angle of the switching device 11 is changed by the controller of the dimmer 10 shown in FIG. 1, a response delay occurs. Therefore, while this response delay occurs, for example, at the startup of the illumination system 100 shown in FIG. 1, the value of M described above may be set to a different value.

Further, when the on-phase angle of the switching device 11 controlled by the controller of the dimmer 10 shown in FIG. 1 is less than or equal to a predetermined value, for example, less than or equal to about 20 degrees, the control circuit 200 shown in FIG. 1 may control so that the LED illumination 90 is turned off.

As described above, according to the control circuit 200 of this embodiment, there is provided the time period detection part 210 configured to detect a time period in which the voltage value of the rectified drive voltage Vrd is less than or equal to the predetermined value. Herein, when the voltage value of the rectified drive voltage Vrd is less than or equal to the predetermined value, electric power stored in an electricity storage means such as a capacitor is supplied to the LED illumination 90. Therefore, the feedback current If to the dimmer 10 from the LED illumination 90 may vary largely so that the dimmer current Id flowing to the dimmer 10 becomes unstable. Accordingly, using the time period detection part 210 to detect a time period in which the voltage value of the rectified drive voltage Vrd is less than or equal to the threshold value Vth1, it is possible to detect a time period in which the feedback current If varies largely, i.e. is unstable. Further, the control circuit 200 includes the dimmer current control part 220 configured so that while the voltage value of the rectified drive voltage Vrd is less than or equal to the threshold value Vth1, the control current Ic to the dimmer 10 is greater than or equal to the holding current Ih of the switching device 11 of the dimmer 10. Consequently, even when the feedback current if is unstable, the control current Ic greater than or equal to the holding current Ih is supplied to the dimmer 10 so that the switching device 11 of the dimmer 10 is maintained in a conducting state. Therefore, variation in on-time per period of the rectified drive voltage Vrd, i.e. variation in pulse width per period of the rectified drive voltage Vrd, becomes small. Thus, it is possible to reduce jitter due to variation in pulse width of the rectified drive voltage Vrd to thereby suppress flickering of the LED illumination 90 and further it is possible to prevent degradation of the power efficiency.

Further, according to the control circuit 200 of this embodiment, there are provided the time period detection part 210 configured to output the detection signal Sd including a pulse whose pulse width is based on a time period in which the voltage value of the rectified drive voltage Vrd is greater than the predetermined value, and the load current control part 270 configured to control the load current Ix to the LED illumination 90 based on the pulse density of the detection signal Sd in the predetermined term. Herein, the time period in which the voltage value of the rectified drive voltage Vrd is greater than the predetermined value is determined based on the on-phase angle of the switching device 11 of the dimmer 10. However, the time period in which the voltage value of the rectified drive voltage Vrd is greater than the predetermined value may vary per period due to the influence of noise, offset variation of the rectifier 20, or the like. On the other hand, even if the time period in which the voltage value of the rectified drive voltage Vrd is greater than the predetermined value varies per period, variation per period of the rectified drive voltage Vrd is canceled or reduced in terms of the rate or ratio of pulses of the detection signal Sd included in the predetermined term, i.e. the pulse density of the detection signal Sd in the predetermined term. Therefore, since the load current control part 270 controls the load current Ix to the LED illumination 90 based on the pulse density of the detection signal Sd, the load current Ix is not easily affected by noise or pulse width variation of the rectified drive voltage Vrd so that the load current Ix based on the on-phase angle of the switching device 11 can be supplied to the LED illumination 90. Consequently, it is possible to suppress flickering of the LED illumination 90 due to variation in a time period in which the voltage value of the rectified drive voltage Vrd is greater than the predetermined value and further it is possible to prevent degradation of the power efficiency.

CONCLUSION

It is to be appreciated that the Detailed Description section, and not the Summary and Abstract sections, is intended to be used to interpret the claims. The Summary and Abstract sections may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A control circuit configured to control electric power to a load based on a rectified drive signal, the rectified drive signal being a drive signal rectified by a rectifier, the drive signal being an alternating-current signal whose phase is controlled by a dimmer comprising a switching device, the control circuit comprising:
   a time period detection part configured to detect a time period in which an amplitude of the rectified drive signal is less than or equal to a predetermined level, wherein the time period detection part is configured to output a detection signal including a pulse having a pulse width that is based on a time period in which the amplitude of the rectified drive signal is greater than the predetermined level; and
   a dimmer current control part being configured so that a control current to the dimmer is greater than or equal to a holding current of the switching device during the time period.

2. The control circuit of claim 1, wherein the dimmer current control part comprises:
   a field-effect transistor configured such that the control current flows as a drain current of the field-effect transistor, and
   a clamp circuit configured to clamp a gate voltage of the field-effect transistor to a predetermined value during the time period.

3. The control circuit of claim 2, wherein the dimmer current control part
   further comprises: a constant voltage circuit configured such that a drain voltage of the field-effect transistor becomes less than or equal to a predetermined value.

4. The control circuit of claim 3, wherein the field-effect transistor is a low-voltage field-effect transistor.

5. The control circuit of claim 2, wherein the dimmer current control part further comprises:
   a control current circuit configured to control the gate voltage based on a feedback current from the load to the dimmer while the amplitude of the rectified drive signal is greater than the predetermined level.

6. The control circuit of claim 1, wherein the time period detection part is configured to detect the time period in which the amplitude of the rectified drive signal is greater than the predetermined level.

7. The control circuit of claim 6, further comprising: a load current control part configured to control a load current to the load based on a pulse density of the detection signal in a predetermined term.

8. A control circuit configured to control electric power to a load based on a rectified drive signal, the rectified drive signal being a drive signal rectified by a rectifier, the drive signal being an alternating-current signal whose phase is controlled by a dimmer comprising a switching device, the control circuit comprising:
   a time period detection part configured to output a detection signal including a pulse whose pulse width is based on a time period in which an amplitude of the rectified drive signal is greater than a predetermined level; and
   a load current control part configured to control a load current to the load based on a pulse density of the detection signal in a predetermined term.

9. The control circuit of claim 8, wherein the load current control part comprises: a signal processing circuit configured to calculate the pulse density based on the detection signal.

10. The control circuit of claim 8, wherein the predetermined term is longer than a period of the alternating-current signal.

11. A circuit comprising:
a dimmer, comprising a switching device, and configured to control a phase of an alternating-current signal, wherein the phase controlled alternating current signal is a drive signal;
a rectifier configured to rectify the drive signal;
a time period detection part configured to detect a time period in which an amplitude of the rectified drive signal is less than or equal to a predetermined level and output a detection signal including a pulse having a pulse width that is based on a time period in which the amplitude of the rectified drive signal is greater than the predetermined level; and
a dimmer current control part configured such that a control current to the dimmer is greater than or equal to a holding current of the switching device during the time period.

\* \* \* \* \*